United States Patent [19]
Schmid

[11] Patent Number: 4,554,221
[45] Date of Patent: Nov. 19, 1985

[54] RECHARGEABLE BATTERY PACK

[75] Inventor: Hartmut Schmid, North Vancouver, Canada

[73] Assignee: DSL Dynamic Sciences Limited, St. Laurent, Canada

[21] Appl. No.: 693,983

[22] Filed: Jan. 23, 1985

[51] Int. Cl.⁴ .............................................. H01M 2/00
[52] U.S. Cl. .......................................... 429/1; 429/99; 429/123; 429/159; 429/178
[58] Field of Search ....................... 429/1, 96, 99, 100, 429/121, 123, 159, 98, 178, 158

[56] References Cited

U.S. PATENT DOCUMENTS

| | | | |
|---|---|---|---|
| 2,397,469 | 4/1946 | Casanov | 429/100 X |
| 3,064,068 | 11/1962 | Fouch | 429/1 X |
| 3,219,485 | 11/1965 | Foecking et al. | 429/99 |
| 3,864,172 | 2/1975 | Marks | 429/1 |
| 4,084,037 | 4/1978 | Morton | 429/1 |
| 4,129,688 | 12/1978 | Fischer et al. | 429/97 |
| 4,247,603 | 1/1981 | Leffingwell et al. | 429/1 |
| 4,514,477 | 4/1985 | Kobayashi | 429/98 |
| 4,515,872 | 5/1985 | Okano | 429/99 |

FOREIGN PATENT DOCUMENTS 193450  11/1957  Austria .

*Primary Examiner*—Anthony Skapars
*Attorney, Agent, or Firm*—Christensen, O'Connor, Johnson & Kindness

[57] ABSTRACT

A rechargeable battery pack that is easily installed and removed without the use of tools and with assurance that the correct polarity of the batteries will be established. A plurality of rechargeable batteries (54) are contained by a top cover (50) and a bottom cover (52). The bottom cover includes a pair of locating holes (65, 67) and a pair of recessed female connectors (66, 68) that are connected to the batteries to provide terminals of opposite polarity. The female connectors (66, 68) and the locating holes (65, 67) are arranged for complementary mating engagement with a pair of male connectors (42) and a pair of locating pins (20, 22), included in an electrical coupling (12) of a device to be powered. The top cover (50) includes a locating hole (55) that is cooperatively aligned with one of the locating holes (65) in the bottom cover so that one of the locating pins (20) of the electrical coupling may be received thereby. To prevent improper insertion of the battery pack, the locating pins (20, 22) are configured differently from one another and the locating holes (55, 65, 67) are configured complementary thereto. To avoid inadvertent damage to the sides of the batteries during installation, the top and bottom covers include tubular skirts (57, 69, 70) that guide the locating pins. The longer of the two locating pins (20) has a threaded end (40) that receives a retaining nut assembly (14) to firmly secure the battery pack in place. To minimize mechanical stress on the electrical connections, the male connectors (42) are mounted on a circuit board (46) that floats relative to the locating pins (20, 22).

20 Claims, 6 Drawing Figures

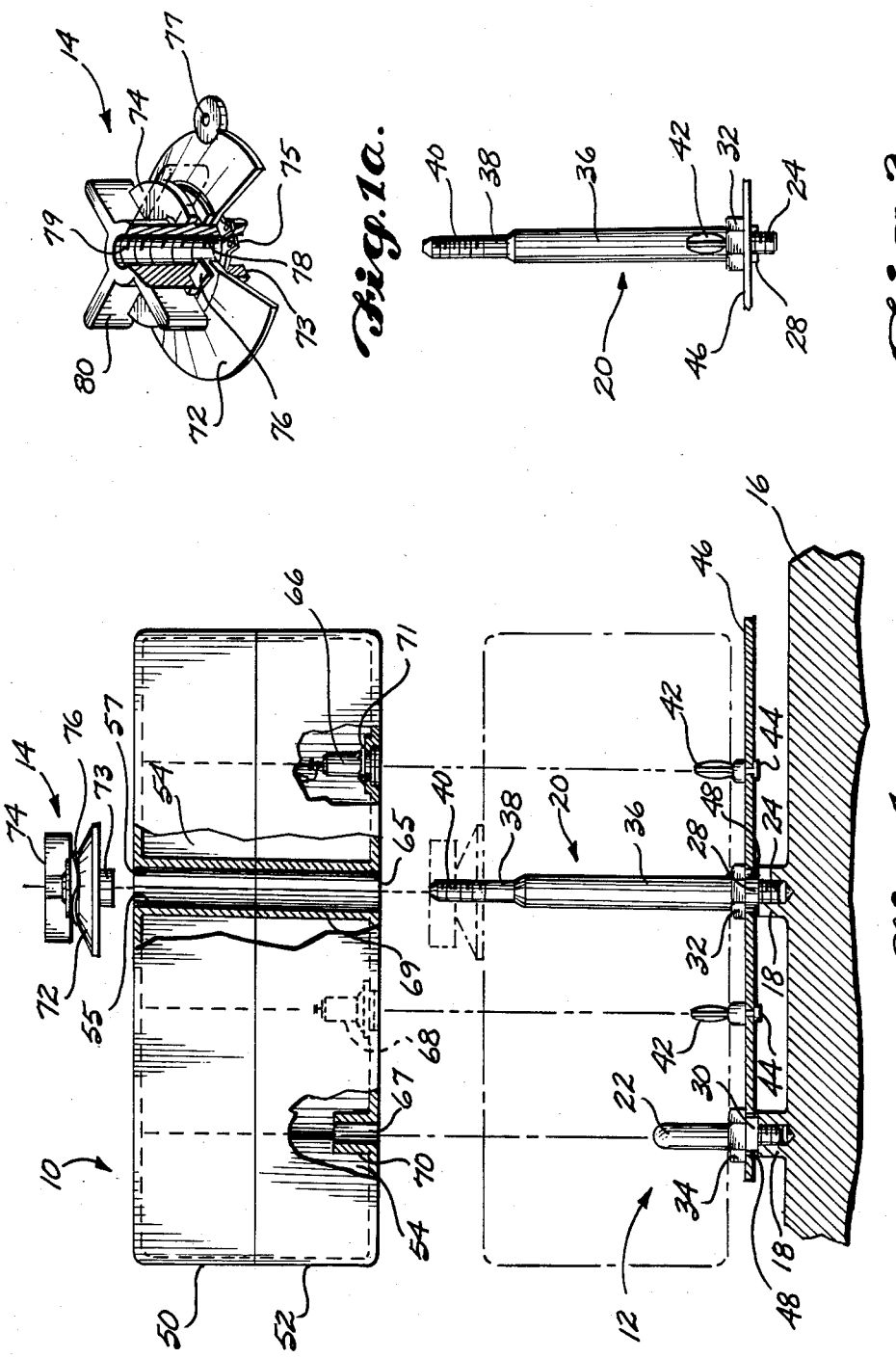

RECHARGEABLE BATTERY PACK

BACKGROUND OF THE INVENTION

The present invention relates generally to rechargeable batteries. More particularly, the invention concerns a rechargeable battery pack that can be easily installed in and removed from a device to be powered without the use of tools and with assurance that the correct polarity of the batteries relative to the requirements of the device will be established.

A wide variety of electrical devices are powered by packs of rechargeable batteries, typically packs containing two or more pairs of conventional "C" or "D" size sealed, rechargeable batteries. A pair of terminals is included for connection with terminals on the device to be powered. Often, these terminals take the form of tabs or connectors on the exterior of the battery pack. Such an arrangement is not particularly desirable since the exposed connectors may be inadvertently, or carelessly, brought into contact with metal objects or surfaces, such as tools, or the frame or housing of the device in which the pack is mounted. This contact can produce a battery-damaging ground or short or can create a spark that will damage the electrical contacts on the battery pack or the object or surface touched. In many applications, the device to be powered includes electronic circuitry that requires a predetermined polarity connection with the batteries. The electrical connectors on battery packs and the configuration of the packs do not always ensure that the packs will be installed so as to provide the correct polarity.

In some applications, the device and battery pack must function under adverse environmental conditions. A rear-of-train telemetry unit that transmits train status information from the rear of the train to the locomotive is a prime example of this type of application. The battery powered unit is mounted on the coupling of the last vehicle of the train and contains an RF transmitter, various sensing devices, and associated electronic circuits. As a result of its positioning, the unit must endure vibration, shock, grime, and extremes of temperature. Although measures are taken to conserve power, the electrical requirements of the system and the environmental factors often necessitate that the batteries be replaced with reasonable frequency. Although the telemetry units may be removed from the vehicle, this is often unfeasible or impractical because of time or locational constraints. As a result, the unit must remain mounted while the batteries are replaced. In adverse weather, this can prove to be a difficult operation or at least one that creates the risk of reversing the polarity of the batteries or causing unwanted contact between the batteries and metallic objects. Even under more hospitable weather conditions, it is not uncommon for the battery packs to be subjected to rough handling that can damage the battery pack and its contacts as well as the electrical contacts in the unit that receives the pack.

From the foregoing, it can be appreciated that it would be extremely desirable to have a rechargeable battery pack that can be installed and removed with ease and with little likelihood of mechanical or electrical damage to the case and batteries or to the device that receives the same. It would be particularly desirable to have such a rechargeable battery pack that further includes an arrangement to prevent the pack from being installed upside down or backwards, i.e., with its electrical contacts connected in reverse with the electrical connections on the unit to be powered.

SUMMARY OF THE INVENTION

The present invention provides a rechargeable battery pack and a rechargeable battery pack assembly incorporating the same.

The rechargeable battery back comprises a top cover, a bottom cover, and a plurality of rechargeable batteries contained within the top and bottom covers. The bottom cover includes a pair of locating holes and a pair of female connectors that are connected to the batteries to provide terminals of opposite polarity. The female connectors and the locating holes are arranged for complementary mating engagement with a pair of male connectors and a pair of locating pins included in an electrical coupling of a device to be powered. The top cover also includes a locating hole that is cooperatively aligned with one of the locating holes in the bottom cover so that one of the locating pins of the electrical coupling may be received thereby.

In a preferred embodiment, the female connectors are recessed within the bottom cover so that shorting or grounding of the batteries is not likely to occur with careless handling.

According to another aspect of the invention, the two locating pins of the electrical coupling are configured differently from one another and the locating holes in the top and bottom covers are configured complementary thereto so that the battery pack can be installed in only one position. In a preferred embodiment, the locating pins and male connectors are arranged in an alternating, linear pattern so that one of the locating pins is positioned between the male connectors and one of the male connectors is positioned between the locating pins.

In accordance with a further aspect of the invention, the top and bottom covers each include tubular skirts that are positioned about the locating holes to form sleeves for the locating pins. In a preferred form, the skirts positioned about the cooperatively aligned locating holes in the top and bottom cover extend toward one another in a space that is defined between adjacent batteries. With this arrangement, the locating pin that is received by the cooperatively aligned holes on the top and bottom covers is guided during insertion so that it does not inadvertently damage the sides of the batteries during installation.

According to the invention, the rechargeable battery pack assembly comprises an electrical coupling having a pair of male connectors and a pair of locating pins; a rechargeable battery pack having female connectors and locating holes, which are in releasable, mating engagement with the male connectors and locating pins of the coupling; and fastening means that are engageable with one of the locating pins for releasably connecting the battery pack to the electrical coupling. In a preferred embodiment, the locating pins and male connectors are arranged in an alternating linear pattern, with the locating pins being attached to the device to be powered. In this preferred arrangement, the male connectors are mounted on a circuit board that also has a pair of apertures. The locating pins include shoulders and are mounted on the device and positioned in the apertures of the circuit board so that the shoulders hold the circuit board in a controlled floating relationship with the locating pins and with the device. This arrangement provides a degree of tolerance for the positioning of the locating holes and female connectors on the battery pack and avoids mechanically stressing the male connectors. In this fashion, the risk of damaging or breaking the electrical connection to the device is significantly reduced.

According to a preferred aspect of the invention, the locating pin that is received by the cooperatively aligned holes on the top and bottom covers has a threaded end that receives a retaining nut assembly. The retaining nut assembly has a collar pivotally mounted on an internally threaded winged fastener. With the collar in engagement with the top cover, the winged fastener is engageable or disengageable with the threaded end of the locating pin for installation or removal of the battery pack. Since only manual tightening of the retaining nut assembly is needed to firmly secure the battery pack in place, no tools are required for installation and removal. As well, the retaining nut assembly may be conveniently attached to the device, as, for example, by a cable or bead chain, so as not to be accidentally misplaced or lost.

BRIEF DESCRIPTION OF THE DRAWINGS

The invention can best be understood by the following specification taken in conjunction with the accompanying drawings in which:

FIG. 1 is an exploded front view, in partial section, of a rechargeable battery pack assembly according to the invention;

FIG. 1A is an isometric view of the retaining nut assembly;

FIG. 2 is a side view of the electrical coupling;

DETAILED DESCRIPTION OF THE PREFERRED EMBODIMENT

Figure 3:
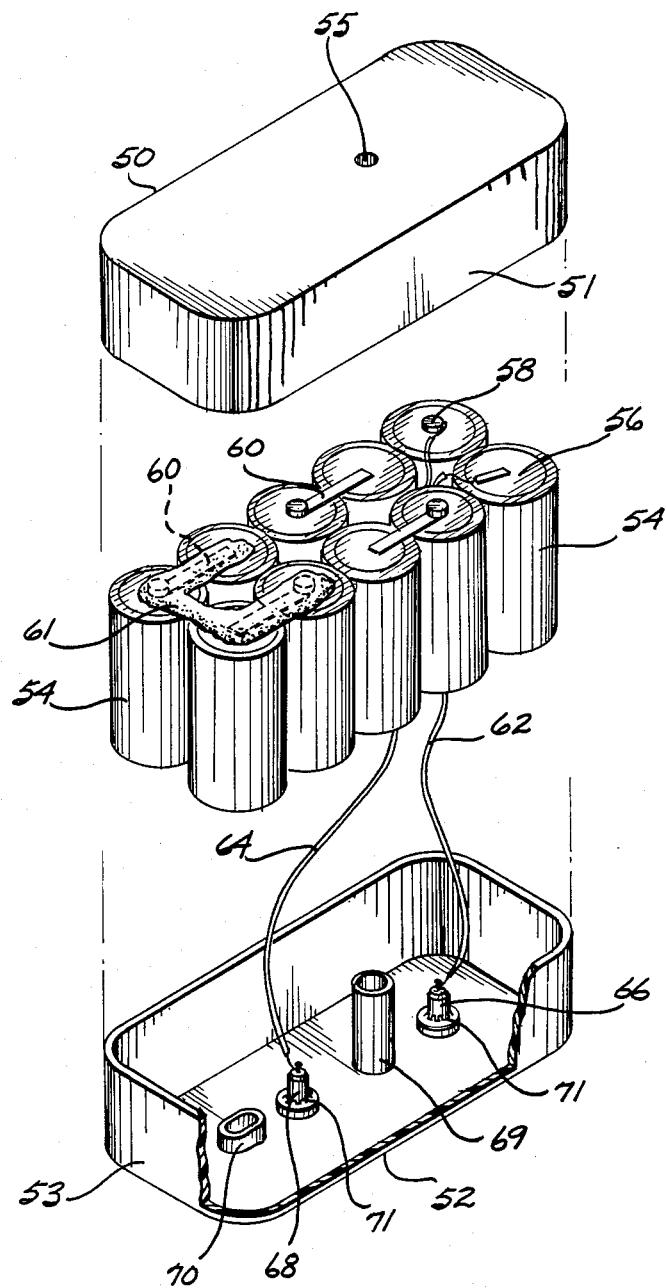
FIG. 3 is an exploded perspective view of the battery pack.

Referring to FIG. 1, the inventive rechargeable battery pack assembly includes a rechargeable battery pack 10, an electrical coupling 12 for a device to be powered, and a retaining nut assembly 14. Reference numeral 16 indicates a rigid portion of the device to be powered, such as a frame, housing, and the like. In the illustrated arrangement, the portion 16 is a die-cast aluminum housing that has raised posts 18 that are internally threaded. A pair of metal locating pins, primary pin 20 and secondary pin 22, have threaded lower ends 24 and 26, respectively, which are received in the raised posts 18. Each of the locating pins 20 and 22 has a cylindrical shoulder, 28 and 30, respectively, immediately above its threaded lower end, 24 and 26, respectively. Above the shoulders 28 and 30, hexagonally shaped nuts 32 and 34 are formed on the pins 20 and 22, respectively. The hexagonally shaped nuts 32 and 34 are used during assembly to tighten the primary and secondary pins 20 and 22, respectively, in the raised posts. The hexagonal shape is not critical for this purpose. Other configurations, such as any nut-like arrangement having two or more flat surfaces, or even a plain cylinder can be employed. In the latter case, a hole, crossways through the pin, can be provided to enable tightening. From the hexagonally shaped nut 34 upwards, the secondary locating pin 22 has a cylindrical shaft that terminates in a rounded end. Upwards from the hexagonally shaped nut 32, the primary locating pin 20 has an intermediate, cylindrically shaped shaft that tapers into an upper, cylindrically shaped shaft 38. Threads 40 are provided on the uppermost end of the shaft 38 for connection with the retaining nut assembly 14, as will be described more fully hereinafter.

With reference to FIGS. 1 and 2, the electrical coupling 12 also includes a pair of male connectors 42 that are mounted by rivets 44 to a circuit board 46. Although not seen in FIGS. 1 and 2, the male connectors 42 are in electrical connection with a contact pad of a printed circuit formed on the upper surface of the circuit board 46. A printed conductor runs from each of the contact pads for the male connectors to termination pads on one edge of the circuit board. Although not illustrated, a variety of arrangements can be made to establish electrical connection between the termination of the conductors for the male connectors 42 and the circuitry of the device to be powered. For example, discrete wires can be soldered to the termination pads and connected to the device to be powered. Such arrangements are not critical to the present invention and will be fully appreciated by those skilled in this art. It is to be noted, however, that the printed circuit may be placed on either the upper or lower surface of the circuit board 46. Rather than using printed conductors, it is possible to use discrete wires for making the electrical connection directly to the male connectors 42. In this approach, flanged connector tabs may be secured to the upper or lower surface of the circuit board by the same rivets 44, which attach the male connectors. The approach chosen will depend upon a variety of factors, including the manner in which the portion 16 of the device is configured. For example, where the portion 16 is a flat surface or a plate, it is more desirable to have the connections on the upper surface of the circuit board 46.

Referring again to FIG. 1, it will be seen that the cylindrical shoulders 28 and 30 of the locating pins pass through circular apertures 48 in the circuit board 46. The apertures 48 are dimensioned slightly larger than the shoulders 28 and 30 so that the circuit board 46 is free to move a short distance to the left or right as viewed in FIG. 1. The lengths of the shoulders 28 and 30 are also selected to be slightly greater than the thickness of the circuit board 46 so that there may be a small degree of movement of the circuit board between the raised post 18 and the nuts 32 and 34. As a result, the circuit board 46 floats a certain amount relative to the locating pins and to the portion 16. As will be discussed in greater detail hereinafter, the primary and secondary locating pins, 20 and 22, respectively, and the male connectors 42 are received by the battery pack 10. The floating circuit board arrangement accommodates the accumulated tolerances for the components of the battery pack and coupling and ensures that the male connectors 42 and the remainder of the electrical connections are not mechanically stressed during intallation or removal of the battery pack from the electrical coupling. It is also to be noted that the weight of the battery pack is not borne by the male connectors, but, rather, is carried by the locating pins 20 and 22 and transferred thereby to the device. To lessen the load on the locating pins, it is desirable to provide additional support posts on the portion 16 of the device. Although not shown, it is preferred to position a pair of posts on each of opposite sides of the circuit board 46 as viewed in FIG. 2 and in locations such that the posts will contact the bottom cover slightly inwardly from the four corners thereof. The height of the posts is chosen so that the bottom cover rests upon the posts when the battery pack is installed. This arrangement is particularly advantageous where the device is one that is subject to vibration. A rear-of-train telemetry unit is an example of a device that requires that measures be taken to minimize vibration-induced stress on the electrical connections.

Referring now to FIGS. 1 and 3, the rechargeable battery pack includes a top cover 50 and a bottom cover 52, which contain and enclose a plurality of sealed, rechargeable batteries 54. These batteries are of a conventional nickel-cadmium type, having a cylindrical container that is covered with a thin insulating layer except at one end, where it is left exposed to form the negative terminal 56. A positive terminal 58 is provided on the opposite end. The invention contemplates that any type of rechargeable battery can be used, with ten conventional "D" size rechargeable nickel-cadmium batteries being presently employed in the illustrated pack, which is used in a rear-of-train telemetry unit.

The batteries 54 are connected in series by a plurality of conductive strips 60. The batteries are arranged in pairs, with the conductive strips leading from the negative terminal of one battery to the positive terminal of an adjacent battery. An insulation-covered lead 62 is connected to the positive terminal 58 of one of the batteries, as for example, by soldering, then passed through a space existing between several of the batteries and secured to a female connector 66 included in the bottom cover 52. This female connector thus constitutes the positive terminal of the battery pack. Another isulation-covered lead 64 is suitably connected, as for example, by solder, to the negative terminal of one of the batteries, passed through a space existing between the batteries, and connected to another female connector 68 included in the bottom cover. The connection of the two leads to the female connectors 66 and 68 can also be made by any suitable means, such as soldering.

The top cover 50 and bottom cover 52 are molded plastic parts that are permanently installed on the opposite grouped ends of the batteries. This may be accomplished by applying a suitable noncorrosive adhesive 61, such as RTV, to the grouped ends of the batteries and then joining the top and bottom covers. Alternatively, the top and bottom covers can be joined together along their mating faces with an adhesive or by ultrasonic welding. When this approach is followed, it is desirable to provide suitable cushioning, such as a rubber washer or an air-curable adhesive material, between the batteries and the covers to absorb vibrations.

The top cover 50 and bottom cover 52 include peripheral side edges 51 and 53, respectively, which, when the battery pack is assembled, fit over and engage with the sides of the batteries 54. The peripheral side edges 51 and 53 are preferably dimensioned so as to meet one another and thereby fully enclose the batteries. This arrangement is advantageous since it prevents dirt from entering the battery case and also conceals the fact that conventional "D" type batteries are contained within the case. This reduces the likelihood of theft, since users, for example, employees, will not know that conventional batteries, usable in their personal equipment, are within the battery case.

The top cover 50 also includes a locating hole 55. A tubular skirt 57 extends from the locating hole 55 a distance into the battery case in a space between several of the batteries. In the assembled position, the tubular skirt extends a distance at least equal to about one-third of the distance between the ends of the batteries. In the presently preferred form, the height of the tubular skirt is equal to the full height of the peripheral side edges 51 of the top cover for reasons discussed below. When the battery pack is installed on the electrical coupling, the locating pin 20 passes through tubular skirt 57 and locating hole 55, extending a slight distance above the flat upper surface of the top cover 50 to receive the retaining nut assembly 14. The tubular skirt 57 serves to guide the primary locating pin 20 so that it will not contact the sides of the batteries if someone improperly attempts to force the battery case onto the coupling at an angle. This is important since the threads 40 on the end of the locating pin 20 might otherwise come in contact with and damage the thin insulator on the sides of the batteries.

Figure 4:
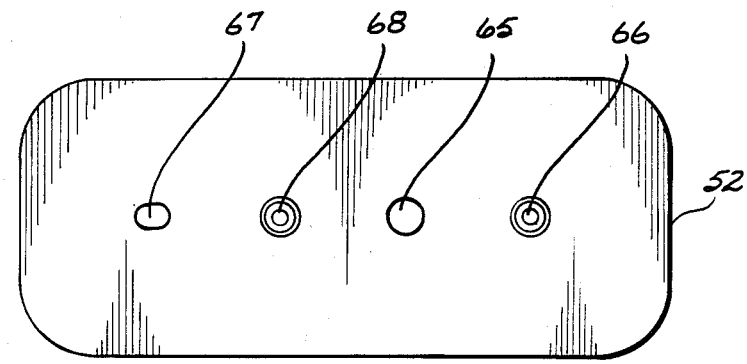
FIG. 4 is a plan view of the bottom cover.

Referring to FIGS. 1, 3, and 4, the bottom cover includes a pair of locating holes 65 and 67 and tubular skirts 69 and 70 extending, respectively, therefrom into the battery case in spaces between several of the batteries. Locating hole 65 and tubular skirt 69 are circular and dimensioned to receive the intermediate shaft 36 of primary locating pin 20 in a close but slidable fit. Tubular skirt 69 functions in a similar manner to tubular skirt 57 of the top cover to guide locating pin 20 so that the same may not be forced into damaging contact with the sides of the batteries. Tubular skirt 69 also extends a distance at least equal to about one-third of the distance between the ends of the batteries. Tubular skirt 69 preferably has a height equal to the height of the peripheral side edge 53. With this arrangement, the tubular skirts 57 and 69 meet face to face to form a continuous tube when the battery case is assembled. When the battery case is installed on the electrical coupling, the mechanical stress resulting from the tightened retaining nut assembly 14 is borne by the mated tubular skirts 57 and 69 rather than by the batteries.

Figure 5:
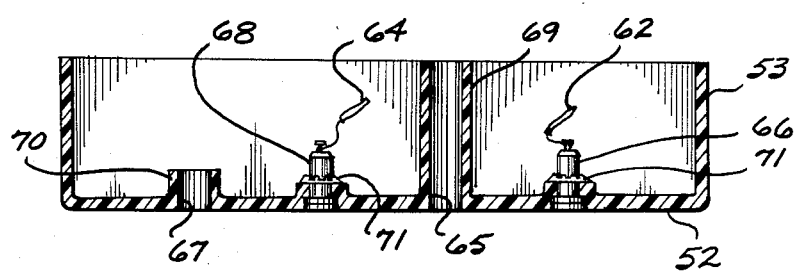
FIG. 5 is a side sectional view of the bottom cover.

Tubular skirt 70 and locating hole 67 have a generally oval shape and are dimensioned to receive the smaller, secondary locating pin 22, with a sliding fit engagement along the smaller axis of the oval. Although a circular configuration could be used, the oval shape is preferred so that there is a measure of sideways tolerance, i.e., to the left and right as viewed in FIGS. 1, 2, and 5. This tolerance is preferred to ensure that the battery pack can continue to be installed and removed in the event that one or the other of the locating pins becomes slightly angled or bent. The oval shape of the hole also provides a measure of locational tolerance for positioning the primary and secondary pins 20 and 22.

It is important to note that the intermediate shaft 36 of primary locating pin 20 has a larger diameter than the diameter of secondary locating pin 22 and that the locating holes 65 and 67 and their associated skirts are configured accordingly. This arrangement prevents the battery case from being installed in a reverse direction so as to connect the female connectors 66 and 68 to the incorrect male connector 42. As noted earlier, the electrical connections to the unit to be powered are likely to require a predetermined polarity. The arrangement of locating holes and locating pins here assures that proper polarity will always be established. It will also be observed that there is no likelihood that there will even be momentary contact between the connectors of the wrong polarity because of the height relationship between the intermediate shaft 36 of primary locating pin 20 and the shorter secondary locating pin 22. If an attempt were made to install the battery pack backwards, i.e., insert secondary locating pin 20 through locating hole 67, rather than locating hole 65, movement of the battery case onto the secondary locating pin 20 would be arrested at the point where the intermediate shaft 36 tapers into the upper shaft 38.

Since the top cover 50 has only a single locating hole, the battery pack cannot be installed in an upside down, or inverted, position. Again, it will be observed that if such an installation were attempted, the battery pack would be prevented from contacting the ends of the male connectors 42. Thus, protection is consistently afforded against improper polarity connection or mechanical harm to the male connectors 42.

Referring again to FIGS. 1 and 5, it will be seen that the female connectors 66 and 68 are received in receptacles formed in the bottom cover so that their outermost ends are recessed, i.e., positioned inwardly from the flat outer surface of the bottom cover. Since the battery pack is by design intended to be removed from the unit for recharging purposes, it is advisable to assume that the pack may not be handled with the greatest of care while being carried or stored. The female connectors are, thus, preferably recessed so that no sparking or shorting or grounding of the batteries will likely occur if the case is mishandled, such as by being tossed into a toolbox or set upon a metallic surface.

The male connectors 42 are of conventional banana plug design, while the female connectors 66 and 68 are conventional connectors for receiving such banana plugs. The female connectors are each received in recesses formed in the bottom cover and held there by spring-grip fasteners 71. If desired, a full socket can be formed in the bottom cover for the female connectors. Tubular electrical sockets, held in place by friction, would be used with this arrangement.

While a variety of fastening means may be employed to engage the threads 40 of the primary locating pin 20 an thus secure the battery pack in place on the coupling, it is preferred to use the retaining nut assembly 14 shown in FIGS. 1 and 1A. This assembly includes a washer-like collar 72 having a centrally located through-hole. A barrel portion 73 of a winged fastener 74 is positioned in the through-hole of the collar 72 for rotary movement. The winged fastener and collar are separated by a spring washer 76, or alternately a flat washer, and are joined together by a clip 75 that is positioned on the barrel portion of the winged fastener. Upward from the barrel portion, the winged fastener has four orthogonally disposed wings or spokes 80 that are gripped when attaching the retaining nut assembly to the primary locating post 20. For this attachment, a bore 78 is provided completely through the winged fastener from the bottom of the barrel through the top of the hub where the four wings meet. Internal threads 79 are provided within about the first top half of the bore. With this arrangement, the threads 40 on the primary locating pin 20 must extend well into the bore in order to be engaged. Advantageously, this helps to prevent cross-threading. An auxiliary attachment hole 77 projects outward from the lower edge of the collar 72 and is intended to receive a bead chain, a wire, or similar device so that the retaining nut assembly may be attached to the device to be powered. This optional measure is taken to reduce the risk that the retaining nut assembly will be accidentally misplaced or lost.

In some applications, the battery pack may be used to power a device that, itself, is contained within a box or other housing having a hinged lid that is held in place by a toggle clasp. As an alternative to the retaining nut assembly 14, the battery pack for these applications may be retained by a force exerted by the lid of the housing. To accomplish this, an elastic cushion can be interposed between the lid and the top cover of the battery pack. Conveniently, this cushion can have a doughnut shape so that it can be positioned over the end of the primary locating pin 20, which extends through the top cover. By attaching the cushion to the lid, the necessary force for retaining the battery pack is automatically applied each time the lid is closed and secured by the toggle clasp. It will be appreciated, that with this arrangement, it is not necessary to provide threads on the end of the primary locating pin 20.

From the foregoing, it will be appreciated that the invention provides a rechargeable battery pack and an assembly that includes a coupling for receiving the same that is easily installed and removed. Means are provided for assuring that the battery pack is installed in the proper attitude with the correct polarity connections. The invention further provides means for ensuring that the electrical connections to the unit to be powered are not damaged by rough or careless insertion of the battery pack or by externally induced vibrations. Also included are means for protecting the batteries from both physical damage and from electrical damage when the battery pack is removed from the device to be powered.

It will be appreciated by those skilled in the art that modifications can be made to the embodiment here described. For example, while the alternating, linear pattern of locating pins and male connectors in the coupling is preferred, other suitable patterns or arrangements of pins and connectors can be employed. In this regard, it is preferred, but not essential that the floating circuit board arrangement be used. It will also be recognized that the locating pins and the locating holes in which they are received may take on a wide variety of shapes, configurations, and dimensions. For economic reasons, it may also be desirable to use the same piece for both the top and the bottom covers. Where the preferred plastic material is used for the covers, such an approach would require only one mold. The top cover would then have two locating holes and two holes corresponding to the holes of the bottom cover, which receive the female connectors. To avoid possible upside down insertion of the battery case, it would be advisable with this approach to cover at least the "unused" locating hole and preferably all three of the unused holes.

These and other modifications and substitutions of equivalents will be apparent from a reading of this specification. It is to be understood by those skilled in the art that the invention is not limited to the embodiment described herein but, rather, is intended to embrace the invention defined in the following claims.

The embodiments of the invention in which an exclusive property or privilege is claimed are defined as follows:

1. A rechargeable battery pack constructed so as to be releasably connected to an electrical coupling of a device to be powered, said electrical coupling having a pair of male connectors and a pair of locating pins, said battery pack comprising:
   a plurality of rechargeable batteries positioned in side-by-side relationship with the ends thereof arranged in two opposed groups;
   a top cover positioned on one of said groups of ends, said top cover having peripheral edges that fit over the sides of said batteries, said top cover having a locating hole; and a bottom cover positioned on the other one of said groups of ends, said bottom cover having peripheral edges that fit over the sides of said batteries, said bottom cover having a pair of female connectors and a pair of locating holes, said female connectors being connected to said batteries to provide terminals of opposite polarity, said female connectors and locating holes being arranged for complementary mating engagement with the male connectors and locating pins, respectively, of said electrical coupling, one of said locating holes being cooperatively aligned with the locating hole in the top cover to receive one of said locating pins.

2. The battery pack of claim 1, wherein said female connectors are recessed within said bottom cover.

3. The battery pack of claim 2, wherein the locating pins of said electrical coupling are configured differently from one another and wherein the cooperatively aligned locating holes in the top cover and the bottom cover are each configured so as to receive one of said locating pins, and wherein the other one of the locating holes in the bottom cover is configured to receive only the other one of said locating pins.

4. The battery pack of claim 3, wherein said locating pins and said male connectors are arranged in an alternating, linear pattern so that one of said locating pins is positioned between said male connectors and one of said male connectors is positioned between said locating pins.

5. The battery pack of claim 4, wherein said top cover and said bottom cover each include tubular skirts positioned about the locating holes to form sleeves for said locating pins.

6. The battery pack of claim 5, wherein the respective skirts positioned about the cooperatively aligned locating holes in the top and bottom covers extend toward one another in a space defined between adjacent ones of said batteries.

7. The battery pack of claim 6, wherein said locating pins are each circular in cross section, and wherein said other one of the locating pins has a smaller diameter than said one of the locating pins, and wherein said other one of the locating holes in the bottom cover is noncircular but configured to receive only said other one of the locating pins.

8. A rechargeable battery pack constructed so as to be releasably connected to an electrical coupling of a device to be powered, said electrical coupling having a pair of male connectors and a pair of locating pins, said battery pack comprising a top cover, a bottom cover, and a plurality of rechargeable batteries, said batteries being contained within said top and bottom covers, said bottom cover having a pair of female connectors and a pair of locating holes, said female connectors being connected to said batteries to provide terminals of opposite polarity, said female connectors and locating holes being arranged for complementary mating engagement with the male connectors and locating pins, respectively, of said electrical coupling, one of said locating holes being cooperatively aligned with the locating hole in the top cover to receive one of said locating pins.

9. The battery pack of claim 8, wherein said female connectors are recessed within said bottom cover.

10. The battery pack of claim 9, wherein the locating pins of said electrical coupling are configured differently from one another and wherein the cooperatively aligned locating holes in the top cover and the bottom cover are each configured so as to receive one of said locating pins, and wherein the other one of the location holes in the bottom cover is configured to receive only the other one of said locating pins.

11. The battery pack of claim 10, wherein said locating pins and said male connectors are arranged in an alternating, linear pattern so that one of said locating pins is positioned between said male connectors and one of said male connectors is positioned between said locating pins.

12. The battery pack of claim 11, wherein said top cover and said bottom cover each include tubular skirts positioned about the locating holes to form sleeves for said locating pins, the respective skirts positioned about the cooperatively aligned locating holes in the top and bottom covers extending toward one another in a space defined between adjacent ones of said batteries.

13. The battery pack of claim 12, wherein said locating pins are each circular in cross section, and wherein said other one of the locating pins has a smaller diameter than said one of the locating pins, and wherein said other one of the locating holes in the bottom cover is noncircular but configured to receive only said other one of the locating pins.

14. A rechargeable battery pack assembly for a device to be powered, said assembly comprising:
an electrical coupling connected to said device, said coupling having a pair of male connectors and a pair of locating pins;
a rechargeable battery pack, said battery pack having a top cover, a bottom cover, and a plurality of rechargeable batteries, said batteries being contained within said top and bottom covers, said bottom cover having a pair of female connectors and a pair of locating holes, said female connectors being connected to said batteries to provide terminals of opposite polarity, said female connectors and locating holes being in releasable, mating engagement with the male connectors and locating pins, respectively, of said electrical coupling, said top cover having a locating hole that is cooperatively aligned with one of the locating holes in said bottom cover, one of said locating pins being received by said cooperatively aligned locating holes; and
fastening means engageable with the one of said locating pins that is received by said cooperatively aligned locating holes for releasably connecting said battery pack to said electrical coupling.

15. The assembly of claim 14, wherein said female connectors are recessed within said bottom cover.

16. The assembly of claim 15, wherein said one of the locating pins that is received by said cooperatively aligned locating holes is configured in length to extend through said battery pack, and wherein the other one of said locating pins is configured in length to extend only partially through said battery pack.

17. The assembly of claim 16, wherein said locating pins and said male connectors are arranged in an alternating, linear pattern so that one of said locating pins is positioned between said male connectors and one of said male connectors is positioned between said locating pins.

18. The assembly of claim 17, wherein said locating pins are configured differently from one another in cross section, and wherein the other one of the locating holes in said bottom cover is configured to receive only the other one of said locating pins.

19. The assembly of claim 18, wherein said locating pins include shoulders and are mounted on said device, and wherein said male connectors are mounted on a circuit board, said circuit board having a pair of apertures, one of said locating pins being positioned in each of said apertures, the shoulders on said locating pins holding said circuit board in a controlled floating relationship with said locating pins and with said device.

20. The assembly of claim 19, wherein said one of the locating pins that is received by said cooperatively aligned locating holes has a threaded end, and wherein said fastening means comprises a retaining nut assembly, said retaining nut assembly having a collar pivotally mounted on a winged fastener, said winged fastener having internal threads that are releasably engaged with the threaded end of said one of the locating pins.

* * * * *